United States Patent
Lee et al.

(10) Patent No.: US 6,678,727 B1
(45) Date of Patent: *Jan. 13, 2004

(54) AUTOMATIC AND SECURE SYSTEM FOR REMOTE ACCESS TO ELECTRONIC MAIL AND THE INTERNET

(75) Inventors: Chong C. Lee, Portland, OR (US); Charles E. Neal, Hillsboro, OR (US)

(73) Assignee: Veicon Technology, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/404,924

(22) Filed: Sep. 24, 1999

Related U.S. Application Data

(63) Continuation-in-part of application No. 08/855,100, filed on May 13, 1997, now Pat. No. 5,958,007.

(51) Int. Cl.[7] .............................................. G06F 15/177
(52) U.S. Cl. ........................ 709/221; 709/222; 709/228
(58) Field of Search ................................ 709/203, 220, 709/221, 227, 217, 229, 222, 228; 455/412; 345/428; 707/501.1; 235/381, 375

(56) References Cited

U.S. PATENT DOCUMENTS

| | | | |
|---|---|---|---|
| 4,837,798 A | | 6/1989 | Cohen et al. |
| 4,902,881 A | * | 2/1990 | Janku ........................ 235/375 |
| 5,018,190 A | | 5/1991 | Walker et al. |
| 5,040,142 A | | 8/1991 | Mori et al. |
| 5,245,656 A | | 9/1993 | Loeb et al. |
| 5,280,581 A | | 1/1994 | Bathrick et al. |
| 5,333,152 A | | 7/1994 | Wilber |
| 5,416,842 A | | 5/1995 | Aziz |
| 5,442,633 A | | 8/1995 | Perkins et al. |
| 5,442,771 A | * | 8/1995 | Filepp et al. ............ 707/501.1 |
| 5,473,676 A | | 12/1995 | Frick et al. |
| 5,479,472 A | * | 12/1995 | Campana et al. ........... 455/412 |
| 5,483,466 A | * | 1/1996 | Kawahara et al. .......... 709/203 |
| 5,572,005 A | * | 11/1996 | Hamilton et al. ........... 235/381 |
| 5,598,536 A | | 1/1997 | Slaughter, III et al. |
| 5,671,414 A | | 9/1997 | Nicolet |
| 5,764,235 A | * | 6/1998 | Hunt et al. ................. 345/428 |
| 5,852,720 A | | 12/1998 | Gready et al. |
| 5,857,074 A | | 1/1999 | Johnson |
| 5,958,007 A | * | 9/1999 | Lee et al. .................... 709/217 |
| 6,199,106 B1 | * | 3/2001 | Shaw et al. ................. 709/203 |
| 6,341,314 B1 | * | 1/2002 | Doganata et al. ........... 709/229 |

* cited by examiner

*Primary Examiner*—Le Hien Luu
(74) *Attorney, Agent, or Firm*—Kolisch Hartwell, P.C.

(57) ABSTRACT

A system and method for providing a remote user with secure, temporary access to electronic mail and/or the Internet. The invented system includes one or more remote terminals, each including an input device and a display, and a system server for communicating with the terminals. The server is capable of displaying prompts on each of the displays and reading user inputs on each of the input devices. Furthermore, the server is operatively connected with the user's home system, typically via an electronic network. The system further includes a program executing on the system server for prompting one or more users located at the one or more remote terminals to enter inputs and for automatically configuring a configuration file for each remote user. Each configuration file contains information responsive to a corresponding one of the user's inputs, and each of the files is usable by the system server to operatively connect the corresponding user with that user's home system via the electronic network, based at least in part on the user's individual inputs. The system server executes the configuration file in such a manner as to provide each user with customized remote access to the user's home system in a secure operating environment dictated at least in part by the user's network client choices. A method of using the system is also described, as well as an embodiment of the system in which the system server and one or more remote terminals are the same computing device.

20 Claims, 4 Drawing Sheets

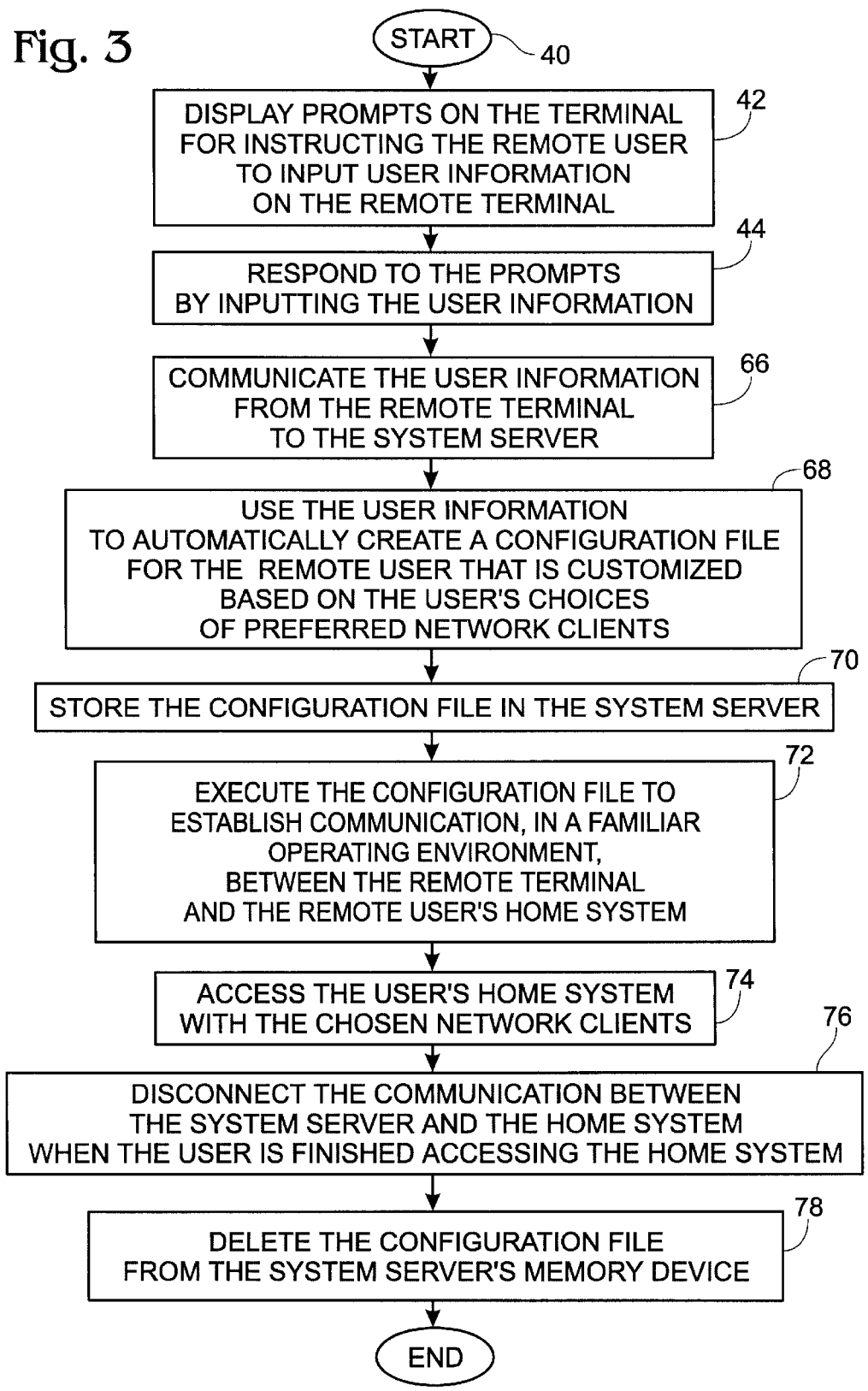

AUTOMATIC AND SECURE SYSTEM FOR REMOTE ACCESS TO ELECTRONIC MAIL AND THE INTERNET

RELATED APPLICATION

This application is a continuation-in-part of U.S. patent application Ser. No. 08/855,100, which was filed on May 13, 1997, issued as U.S. Pat. No. 5,958,007 on Sep. 28, 1999, and the disclosure of which is hereby incorporated by reference.

FIELD OF THE INVENTION

The present invention relates generally to remote access systems for enabling users to contact their home systems when traveling or otherwise away from their home systems. More particularly, the invention concerns an automatic and secure system for providing a remote user with temporary access to the user's home system in a familiar operating environment, and a method of using the same.

BACKGROUND OF THE INVENTION

Today, more and more people use electronic mail (e-mail) and the Internet as a means for communicating with others and gathering and disseminating information. When a user is at home or work where the user has a computer that is pre-configured to establish a link to the user's home system, sending and receiving e-mail or accessing the Internet is relatively quick and easy. The computer has e-mail and Internet or network-browsing clients with which the user is comfortable, and thereby provides a familiar operating environment every time the user uses the clients. This is especially beneficial because the clients will vary in commands, operating procedures, display formats, etc. Therefore, while a user may feel very comfortable with and be very fast at using the user's preferred choice of client, the user may be unfamiliar with another client for a similar application. As a result, the user will not only be very uncomfortable using that client but also will be significantly slower than when using the user's preferred client.

When the user travels, it becomes much more difficult to communicate with the user's home system in a familiar operating environment. Traditionally, a traveling or remote user required a laptop computer with a modem and the user's preferred choices of e-mail and web-browsing clients pre-configured and installed. Traveling with a laptop is not only cumbersome and inconvenient, but also may be expensive if the laptop is stolen or otherwise damaged during transportation.

On the other hand, when the user travels without a pre-configured laptop computer, establishing communication with the user's home system becomes much more difficult. Moreover, even if communication can be established, it will often be in an operating environment within which the user is unfamiliar and therefore uncomfortable. For example, if the user attempts to use someone else's computer, the user will have to re-configure the computer's clients, if the clients are even installed on the computer. Many users do not have the knowledge or training to accomplish this task. Furthermore, those that do have the knowledge often will not want to take the time to do so. In addition, if the computer does not have the user's preferred choices of clients installed, the user either must obtain, install and configure the clients on the computer, or will have to work in an operating environment within which the user is unfamiliar.

An additional concern for traveling users is security. In order to access the user's home system from a laptop or other computer, a configuration file is conventionally created and stored on that computer. The configuration file includes, among other things, the user's identifying information, such as user identification (user ID) and password. If the user's laptop is stolen or lost, a new user of the computer would be able to access the configuration file and thereby obtain the original user's identifying information. This information can then be used to impersonate the original user and gain access to that user's home system. Unless significant steps are taken to secure or otherwise protect this file, it remains vulnerable to misuse and misappropriation.

Security is an even larger concern when a remote user configures and uses someone else's computer to establish communication with the user's home system. Because the configuration file is stored on that computer, and because the remote user does not retain control of the computer (unlike a laptop, which is generally kept with the user), a subsequent user will have access to the data stored in the prior user's configuration file. Furthermore, merely deleting the configuration file from the computer when the user is finished using the computer is not sufficient to prevent others from accessing the information previously stored in the configuration file. More complex steps and security measures are generally necessary to protect the data sufficiently.

Systems exist today which enable a traveling user to send or receive e-mail and to access the Internet (or "surf the net"). None of these systems, however, allow a remote user to work within an operating environment within which the user is familiar. Furthermore, none of the systems available today enable the user to select the user's preferred choices of e-mail and network browsing clients, automatically configure the selected clients to establish communication with the user's home system, and do so in a secure environment.

Therefore, there is a need for a system and method that enables remote users to access their home system in a secure, familiar environment. Furthermore, there is a need for a system which will automatically configure the user's preferred choices of clients and that will automatically establish communication with the user's home system without requiring the user to have any specialized computer knowledge.

SUMMARY OF THE INVENTION

Briefly, the invented system includes one or more remote terminals, each including an input device and a display, and a system server for communicating with the terminals. The server is capable of displaying prompts on each of the displays and reading user inputs on each of the input devices. Furthermore, the server is operatively connected with the user's home system, via a global electronic network, namely the Internet. The system further includes a program executing on the system server for prompting one or more users located at the one or more remote terminals to enter inputs and for automatically configuring a configuration file for each remote user. Each configuration file contains information responsive to a corresponding one of the user's inputs, and each of the files is usable by the system server to operatively connect the corresponding user with that user's home system via the electronic network, based at least in part on the user's individual inputs. The system server executes the configuration file in such a manner as to provide each user with customized remote access to the user's home system in a secure operating environment dictated at least in part by the user's network client choices.

In another embodiment of the invention, the system server and remote terminal are a single computer on which the program executes responsive to the user's network client choices.

These and additional objects and advantages of the present invention will be more readily understood after consideration of the drawings and the detailed description of the preferred embodiments which follows.

BRIEF DESCRIPTION OF THE DRAWINGS

FIG. 3 is a flow chart illustrating an aspect of the invented method.

DETAILED DESCRIPTION OF THE PREFERRED EMBODIMENTS

As used herein, the term "home system" is intended to mean a computer or network of computers that a user accesses to send and receive e-mail or to access the Internet while the user is not traveling. Therefore, the term should be broadly construed to include a personal computer with remote and Internet access capabilities, an Internet service provider, a mainframe or mini-computer with remote and Internet access capabilities, and a network of interconnected computers with remote and Internet access capabilities. Furthermore, the term "remote user" is intended to refer to an individual that is away from that user's accustomed, home system for sending and receiving e-mail or accessing the Internet, and the terms "network client" and "client" refer to application programs which provide an operating environment for a user when that user engages in a particular activity. For example, examples of e-mail clients are MICROSOFT EXCHANGE, MICROSOFT OUTLOOK, MICROSOFT MAIL, EUDORA PRO, Z-MAIL PRO, PEGASUS, and JUNO. Examples of web-browsing or Internet clients are MICROSOFT INTERNET EXPLORER, NETSCAPE NAVIGATOR, WEBSURFER, and MOSAIC.

Figure 1:
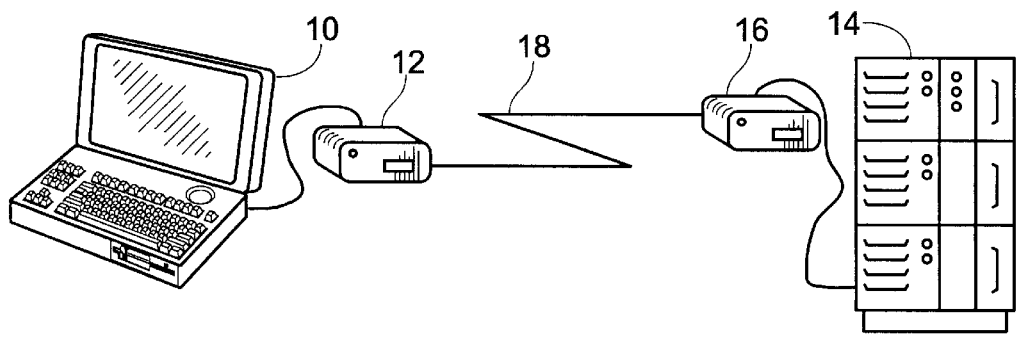
FIG. 1 is a general schematic diagram of a prior art system for providing remote users with access to their home systems.

A prior art system for providing a remote user with temporary access to the user's home system is schematically shown in FIG. 1. The system includes a laptop computer 10 with a modem 12 and a home system 14 with a modem 16. A communication link 18 is established between the laptop and home system using modems 12 and 16 and a conventional telephone line or other suitable telecommunications link.

When the user is away from his or her home system, the user generally must travel with a laptop computer in order to send and receive e-mail and access the Internet. Laptop 10 has the user's preferred and accustomed software loaded and preconfigured thereon so that the remote user is able to send and receive e-mail and to access the Internet in a familiar operating environment. Typically, this means that the remote user simply selects icons representing the user's preferred clients, and the clients are automatically run on the laptop according to preconfigured preferences and settings. Therefore every time the user uses the laptop, a familiar operating environment is encountered, and the user does not have to have any specialized training or knowledge to use the clients. As discussed above, however, the benefits of traveling with a laptop computer quickly begin to diminish as the user has to transport and safeguard the computer at all times.

Figure 2:
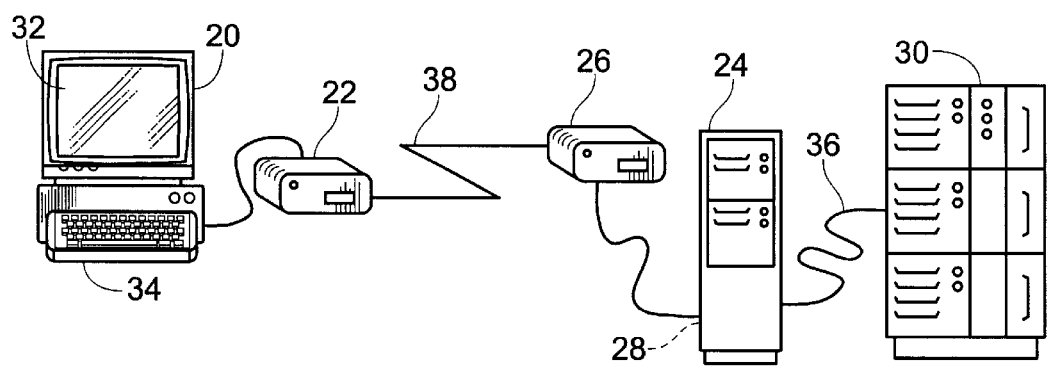
FIG. 2 is a general schematic diagram of the invented system for providing remote users with temporary and secure access to their home systems.

A system constructed in accordance with a preferred embodiment of the present invention is schematically shown in FIG. 2. The system includes a remote terminal 20 with a modem 22, a system server 24 with a modem 26 and a memory device 28, and a home system 30. Remote terminal 20 has a display 32 and an input device 34, such as a keyboard, mouse, joystick, electronic pen or other suitable device through which a user inputs information into the computer. Furthermore, while the remote terminal may have some form of local file storage, in the preferred embodiment of the invention, the terminal has no local file or data storage capacity (i.e. it has no non-volatile storage), for the reasons discussed below.

The term "remote terminal" refers to the computing device from which the remote user accesses that user's home system via communication with the system server. The term includes any suitable computing device capable of communicating with the system server to transmit user inputs thereto and to display outputs from the user's home system via the system server. An example of a remote terminal particularly well-suited for use in the present invention is a WINTERM terminal, which is manufactured by Wyse Technology, Inc. Illustrative, non-exhaustive examples of other remote terminals within the scope of the invention include laptop computers, personal computers (PCs), and hand-held computing devices, such as personal digital assistants (PDA's), smart phones, pagers, digital imaging devices, and the like so long as the criteria set forth herein are satisfied.

It should be understood that the remote terminal may have other elements not shown in the schematic drawing and that the icons shown in the drawings are meant to schematically represent any remote terminal meeting the criteria set forth herein. For example, the terminal may be operatively connected to a printer. It should also be understood that modems 22 and 26 have been shown schematically in FIGS. 2 and 5–6, and may be any conventional internal or external modem. Furthermore, for the reasons discussed below, it may be preferable for the modems, and especially modem 26, to be a multi-modem card which is capable of being used to establish communication between the system server and a plurality of other computers and their respective modems.

System server 24 is a conventional computer operatively coupled with a modem 26 and memory device 28, which typically includes both volatile and non-volatile memory. Server 24 is capable of establishing a link with the Internet, which is schematically indicated at 36 in FIG. 2. Preferably, server 24 is what is commonly referred to as a "back-bone" access provider, although any connection to the Internet will suffice. Also, in the preferred embodiment, the system server is capable of directly connecting to the Internet without the assistance of another processor, although it should be understood that the term "system server" is intended to be broadly construed to include plural computers which are in communication with each other, at least one of which is capable of directly connecting to the Internet. For example, the system server may include a computer that communicates, via modem, with one or more remote terminals, and which is also in communication with another computer (such as an Internet service provider) directly connected to the Internet. Another example is a plurality of computers which are connected, via modem, with a plurality of remote terminals, and which are connected to another computer that is capable of directly connecting to the Internet.

The remote terminal communicates with the system server via modems 22 and 26, linked together by a telephonic link, which is generally indicated at 38 in FIG. 2, e.g. the Public Switched Telephone Network (PSTN). The link may be a more complex, higher speed communication line, such as an ISDN line, in which case modems are not necessary. The system server is configured to cause prompts to be displayed on the remote terminal's display and to receive the user-inputted responses thereto. System server 24 is connected to and communicates with home system 30 via the Internet.

The system further includes software which is installed on the system server and which enables the remote user to access the user's home system in a secure, familiar operating environment, as discussed below. A flow chart shown in FIG. 3 illustrates the steps in the execution and operation of the system, and a flow chart is shown in FIG. 4 which illustrates user responses thereto.

Figure 4:
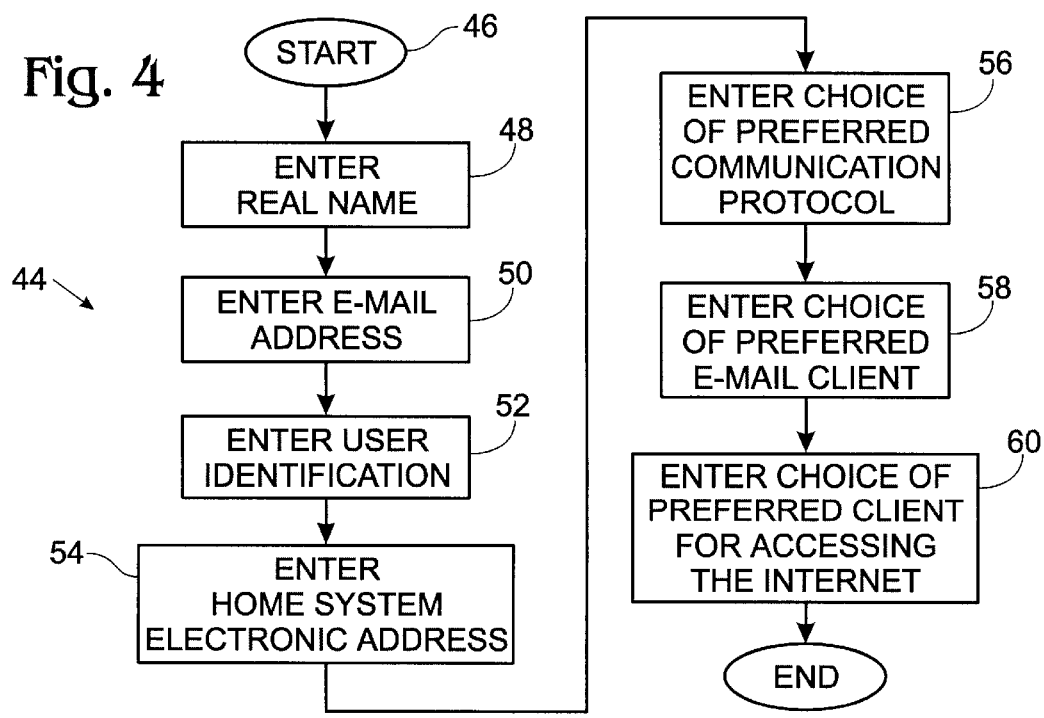
FIG. 4 is a flow chart illustrating the remote user's inputs in response to the prompts displayed on the remote terminal.

Referring collectively to FIGS. 3 and 4, the method may be seen to begin at 40 with the previously described system in which the software is executed and with a remote user located at the remote terminal. At 42, the software causes prompts to be displayed on the remote terminal's display 32 and receives the user's keyboard 34 responses thereto at 44. A flow chart indicating the preferred sequence of user inputs in response to the prompts is shown in FIG. 4. Referring particularly now to FIG. 4, at the beginning of an operating session 46, the software prompts the remote user, via the remote terminal, to enter the user's identifying information. This information includes the user's real name 48, e-mail address 50, user identification 52 (user ID), the electronic address 54 of the user's home system, and the user's choice of preferred communication protocol 56. Typically electronic address 54 is the home system's domain name, although it should be understood that the system's Internet Protocol (IP) address could be entered instead.

Referring still to FIG. 4, the user is also prompted to select, from a pull-down or other menu of available network clients, the user's preferred client for sending and receiving e-mail 58 and the user's preferred client for accessing the Internet 60. It should also be understood that the actual presentation format of the prompts may vary, so long as the user is able to input or otherwise indicate the user's responses to prompts. Additionally, the prompts may include other user-accessible options, such as help screens and the ability to correct incorrect information.

As the user enters this information into the remote terminal, via the input device, the information is communicated to system server 24 at 66 in FIG. 3. Once received by the system server, the identifying information is stored in an identifiable location on the system server's memory device. Typically, the software stores the user's information in a directory or other portion of the memory device allocated for use by a single remote user, although any other suitable configuration for storing and being able to retrieve the user's identifying information and files may be used and are within the scope of the present invention.

Still referring particularly now to FIG. 3, at 68, the software then uses the inputted information to create one or more configuration files for the remote user. It should be understood that network clients, such as e-mail clients and Internet or web-browsing clients, require a configuration file, which is executed and provides the system server with necessary, customizable information about the user's preferences, system resources, settings, etc. As a general rule, the clients require much of the same information, although the information must be presented with different formats, syntaxes, key words, encryption schemes, etc. The software customizes the configuration file based on the user's selected choices of network clients, as well as the inputted user information, to create a file that will provide the remote user with an operating environment with which the user is familiar and accustomed. The configuration file is saved, at 70, on the system server's memory device 28, preferably in the previously described folder. It should be understood that it is intended to be within the scope of the present invention that the system may create a separate configuration for each selected network client, or alternatively, a master configuration file may be created which may be used with both the user's preferred client for sending and receiving e-mail as well the user's preferred client for accessing the Internet. It should also be understood that the term "configuration file" is meant to be broadly construed to include portions of other files which are created and added by the software and used, as discussed above, with the selected network clients. For example, WINDOWS NT uses a registry, which includes configuration data for a wide variety of applications and clients. Therefore, in a WINDOWS NT operating environment, the software discussed above would amend the registry to include configuration information for the remote user's preferred choices of network clients.

In addition to creating the configuration file (or files or portions thereof, as discussed above), the software creates and displays icons on the remote terminal's display 32. The icons may be selected, at 72, by the remote user to establish a communication gateway or link, via system server 24 and the Internet 36, between the remote terminal 20 and the user's home system 30 so that the user may access the user's home system with the chosen clients, at 74. When used, the configured clients may still prompt the user for additional information. For example, the user may be prompted to enter the user's password. Alternatively, the software may prompt the user to enter the user's password along with the user's other identifying information.

Also, once configured and customized for the remote user, the clients may be repetitively used and closed during the entire communication session. Therefore, it is possible for the remote user to use the chosen e-mail client, close that application, use the selected client for accessing the Internet, close that client, and then use the e-mail client again, all by simply clicking on the icons to automatically and transparently establish communication with the user's home system 30 in a familiar, secure operating environment. The chosen clients may also be used concurrently with each other.

Therefore, as discussed above and shown in FIG. 4, all the remote user needs to establish familiar, customized access to the user's home system 30 is the user's identifying information discussed above in response to prompts displayed on the remote terminal's display. It should be understood that some of the information that the user is prompted to enter is optional and is not necessary for the system to operate. An example of this optional, but helpful, information is the user's real name. Other information is necessary, but has a default setting which is used unless the user specifies otherwise. For example, the user's preferred communication protocol, e-mail address, and network client choices will have default settings that will be used if nothing is entered by the user. The default communication protocol will be the industry standard communication protocol, which is currently POP 3, but which soon may be IMAP 4 and which may continue to change as technology advances. Also, when the user selects a particular protocol, the user may be prompted to enter additional configuration information. For example, after selecting IMAP 4 as the user's preferred choice of communication protocol, the user will then be prompted for a directory on the user's home system to save files, e-mail messages and other information.

The user's e-mail address will default to a combination of the user's user ID and the domain name of the user's home system (i.e. userID@domainname.com). If the user does not select both a preferred e-mail client and a client for accessing the Internet, the software will use a default choice for the non-selected client. Alternatively, the system may be configured to only create a configuration file for the selected network client and not to use a default setting for the non-selected type of network client. This option would be useful if the user only wanted to access the Internet but did not want to send and receive e-mail, or vice versa.

As mentioned above, in addition to providing the remote user with access to the user's home system 30 in a familiar operating environment, the invented system also provides a level of security previously not readily available to the traveling user. Because the user's identifying information is not stored on remote terminal 20, subsequent users of the remote terminal are not able to access the prior user's information. Instead, the user's information is stored only on system server 24, which is not accessible by the remote users. This removal of the remote user's confidential information to a non-accessible location eliminates the need for complex security devices and software. Therefore, as mentioned above, it is also not necessary for the remote terminal to include any local (non-RAM) file storage. However, as discussed previously, a remote terminal with local file storage is still within the scope of the invention.

Referring still to FIG. 3, at 76, once the user's operative session is completed, the user-specific information, such as may be stored in the user's folder and which includes all of the user's information, configuration files, and anything which is downloaded by the user, is simply erased from the system server, at 78. As an added level of security, the system may be configured to overwrite the region of the memory device on which the folder was saved. The above-described security measures provides remote users with a heightened level of security because no residual storage of their information remains after the user is finished using the system. Therefore the user can feel free to use the system to handle confidential or other sensitive matters without worrying that others may gain access to this information.

Figure 5:
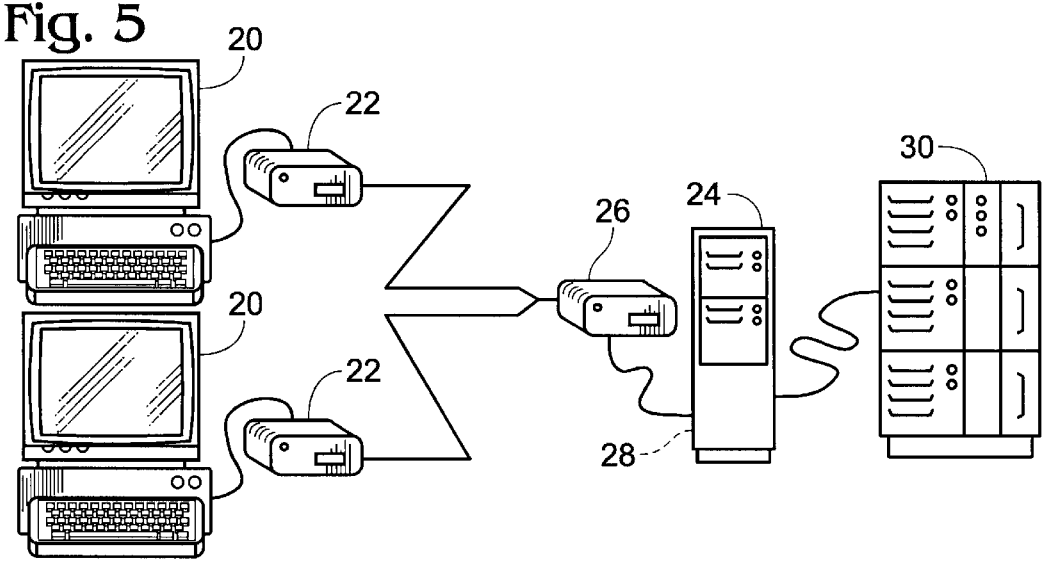
FIG. 5 is a general schematic diagram of an alternative embodiment of the system of FIG. 2 in which the system is configured for simultaneous use by multiple remote users.

As shown in FIG. 5, the previously described system and method of using the same are capable of being used simultaneously by more than one remote user. As shown, the invented plural-user system includes plural remote terminals 20 with modems 22, which communicate with system server 24 through its modem 26. It should be understood that the invented system in this alternate embodiment may include a varying number of remote terminals 20, as long as system server 24 has the capacity to communicate with each of these remote terminals. Also, as discussed above, modems 22 and 26 have been only schematically illustrated in FIGS. 2 and 5–6. Therefore it should be understood that modem 26 schematically represents both internal and external modems, as well as a multi-user modem card and a plurality of modems, each configured to establish communication with a respective one of the modems 22 connected to the remote terminals. The system server stores each remote user's identifing information and configuration file in a discrete location on the system server's memory device. Preferably, the system will create, for each remote user, a separate folder into which information from a specific remote terminal is stored, and then erased, as successive remote users use that terminal.

Figure 6:
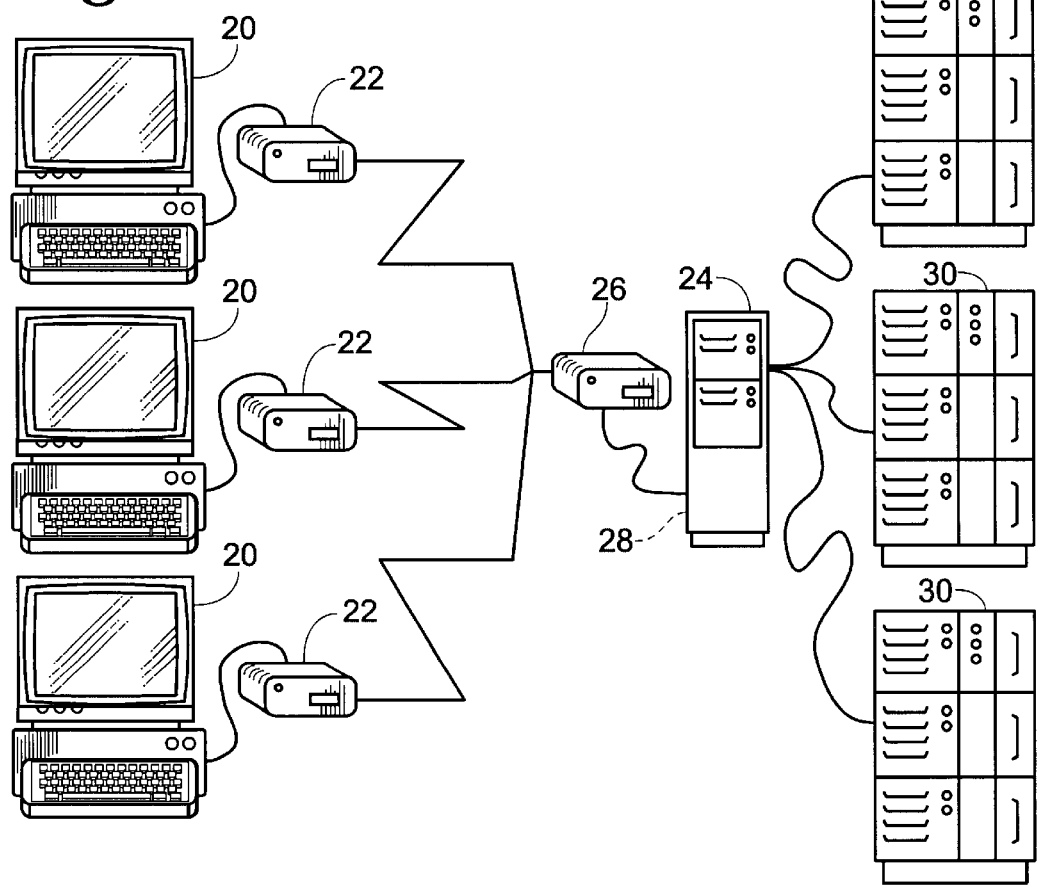
FIG. 6 is a general schematic diagram showing an alternative embodiment of the system shown in FIG. 5, in which the system is configured for simultaneous use by multiple remote users, each having a different home system.

As shown in FIG. 5, the system is capable of establishing communication between two remote users and the same home system. Sometimes, however, both remote users will not have the same home system. Therefore, a system that is also intended to be within the scope of the present invention, is schematically shown in FIG. 6. As shown, the system is configured to enable three remote users, one at each remote terminal 20 to establish secure communication in a familiar operating environment with three different home systems 30. Although remote users may have the same home system, it should be understood that the system does not require this result. All such plural-user systems, however, are within the spirit and scope of the invention. Furthermore, while FIGS. 5 and 6 are meant to be illustrative examples of the multi-user systems that are within the scope of the present invention, the system may be used with many more than two or three remote and home systems. For example, the system server may be capable of establishing simultaneous connections between dozens of remote users and their respective home systems.

Figure 7:
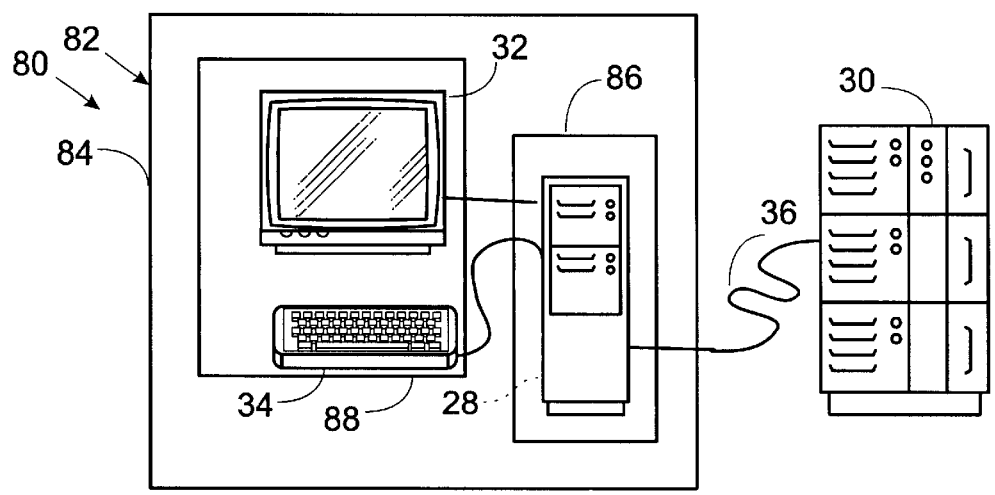
FIG. 7 is a general schematic diagram showing another embodiment of the invented system for providing remote users with temporary and secure access to the Internet and/or their home systems.

Another embodiment of the invented system for providing remote users with temporary and secure access to their home systems is schematically shown in FIG. 7 and generally indicated at 80. In system 80, the system server and remote terminal are the same computing device, which is generally indicated at 82, and includes the previously described elements of remote terminal 20 and system server 24, such as a display 32, user-input device 34, memory device 28 for storing the user's configuration files, and a communication linkage 36 for communicating with a remote user's home system 30 via the Internet. As discussed, this communication linkage may be any suitable physical or wireless communication linkage, such as a telephone line, ISDN line, cable line, etc. The previously described software is installed on device 82.

Because the system server and remote terminal are the same remote computing device in this embodiment of the invention, it may be preferable to provide security to the data stored on device 82 in the form of a physical barrier that prevents unauthorized individuals from accessing elements of device 82 other than display 32 and user input 34. For example, device 82 may be housed within a durable, secure housing that includes a secure region 86, which may only be accessed by authorized users. Region 86 is protected by a lock or other security system or physical barrier that prevents unauthorized access to selected components of the remote computing device, but may be selectively accessed by authorized personnel. For example, the memory device and processor may be housed within the secure region. The display also may be housed within region 86 so long as its screen is visible by a remote user.

Device 82 further includes a user-accessible region 88, which all remote users may access. For example, the display and input device, such as a keyboard and/or mouse, would typically be within the user-accessible region. Other optional components that may be within the user-accessible region are a printer, or at least the output therefrom, and a credit card reader. Because system 80 will typically be placed in locations frequented by travelers, such as airports, hotels, convention centers, shopping centers and the like, one suitable form of housing 84 is a locked, durable kiosk from which remote users may access their home systems.

It is also within the scope of the present invention that any of the other embodiments of the invention may be implemented in a housing, such as a kiosk, containing a secure region and a user-accessible region. For example, the system shown in FIGS. 5 and 6 could be implemented in a kiosk housing system server 24 and multiple remote terminals 20, which typically would communicate with the system server through a physical communication linkage because of the close proximity of the remote terminals to the system server. In a variation of this embodiment, plural remote terminals may be housed within a kiosk and may separately or collectively communicate with a system server located apart from the kiosk.

A further advantage of the system is due to the fact that the communication between the system server and a particular remote user's home system is established via a global computer network, namely, the Internet. Because the Internet may be accessed from virtually anywhere in the world to establish communication with virtually any other location in the world, there will not be long distance or other increased costs to allow a remote user to contact a home system which is in a different city, state or even a different country.

An example of how the previously described system may be implemented is in a hotel, airport or convention center. Remote terminals may be placed in both public and private locations, and each remote terminal will establish communication, via conventional telephonic, ISDN or other communication line, with a system server which is preferably in the same calling zone. The system server then establishes communication, via the Internet, with any home system requested by the remote users, regardless of the distance between the system server and the home system.

Accordingly, while the preferred embodiments of the present invention have been shown and described, it will be apparent to those skilled in the art that other changes in form and detail may be made therein without departing from the spirit and scope of the invention as defined in the appended claims.

We claim:

1. A system for providing a remote user with access to that user's home system via an electronic network, comprising:

a remote computing device including an input device, a display and a memory device, wherein the remote computing device is configured to cause prompts to be displayed on the display and to read user inputs thereto on the input device, and further wherein the computing device is operatively connected with such electronic network; and a program executing on said remote computing device for prompting a remote user located at said remote computing device and away from the remote user's home system to enter inputs and for automatically configuring one or more configuration files for the remote user, wherein said one or more configuration files contain information responsive to the remote user's inputs and are configured for use by said remote computing device to operatively connect the remote user with the user's home system via such electronic network based at least in part on such user's individual inputs, wherein the inputs include selecting an e-mail client from a plurality of available e-mail clients and further wherein the program is adapted to automatically configure the one or more configuration files for use with the selected e-mail client, said remote computing device executing said user's one or more configuration files in such manner as to provide each user with customized remote access to said user's home system.

2. The system of claim 1, wherein the electronic network is the Internet.

3. The system of claim 1, wherein said user inputs and said configuration files contain information regarding such remote user's choice of client for accessing the Internet.

4. The system of claim 3, wherein said configuration files contain information regarding such remote user's user identification and home system electronic address.

5. The system of claim 1, wherein said configuration files contain information regarding such remote user's user identification, e-mail address and home system electronic address, and further wherein the program is configured to prompt the user for such information.

6. The system of claim 1, wherein said configuration files contain information regarding such remote user's choice of client for accessing the Internet and regarding such remote user's choice of e-mail client for e-mail sending or receiving.

7. The system of claim 1, further including a secure housing in which the remote computing device is disposed to prevent unauthorized access to selected components of the remote computing device.

8. The system of claim 7, wherein said housing includes a kiosk that enables the remote user to view the display and access the user input device, but prevents the remote user from directly accessing the memory device.

9. The system of claim 1, wherein the remote computing device is adapted to erase the one or more configuration files for the remote user responsive to the user ending an operative connection with the user's home system.

10. The system of claim 1, wherein the one or more configuration files are stored in a portion of the memory device of the remote computing device, and further wherein the remote computing device is adapted to overwrite the portion of the memory device upon completion of an operative session by the remote user.

11. An electronic network gateway processing system for providing a familiar operating environment for a remote user to the user's home system via an electronic network, the system comprising:

a system server in communication with a remote terminal and said electronic network, wherein the remote terminal includes a hand-held computing device, said system server having a memory device and being capable of prompting said remote user to make choices regarding the user's preferred network clients via said remote terminal, said system server creating one or more configuration files for said user that is based at least in part on said user's network client choices, said one or more configuration files enabling said system server to establish a communication gateway via an electronic network between such remote user and such home system in an operating environment dictated by said user's network client choices.

12. The system of claim 11, wherein the electronic network is the Internet.

13. The system of claim 11, further including a plurality of remote terminals that are each in communication with the system server, wherein the system server is capable of prompting a plurality of remote users, each at a different one of the plurality of remote terminals, to choose their network clients via said remote terminals, wherein the system server creates and saves on its memory device one or more configuration files for each user that is based in part on such user's network client choices.

14. The system of claim 13, wherein the remote terminals have no local file storage capacity.

15. The system of claim 13, wherein the system server is adapted to erase the one or more configuration files responsive to the user ending an operative connection to the user's home system from one of the remote terminals.

16. The system of claim 11, wherein the user's network client choices include the user's preferred e-mail client for sending or receiving e-mail.

17. The system of claim 16, wherein the configuration files contain information regarding such remote user's user identification, e-mail address and home system electronic address.

18. The system of claim 11, wherein the user's network client choices include the user's preferred network client for accessing the Internet.

19. The system of claim 11, wherein the system server is adapted to erase the one or more configuration files for said user responsive to the user ending an operative connection with the user's home system.

20. The system of claim 11, wherein the hand-held computing device is selected from the group consisting of a personal digital assistant and a smart phone.

* * * * *